US005510732A

United States Patent [19]

Sandhu

[11] Patent Number: 5,510,732
[45] Date of Patent: Apr. 23, 1996

[54] SYNCHRONIZER CIRCUIT AND METHOD FOR REDUCING THE OCCURRENCE OF METASTABILITY CONDITIONS IN DIGITAL SYSTEMS

[75] Inventor: Bal S. Sandhu, Fremont, Calif.

[73] Assignee: Sun Microsystems, Inc., Mountain View, Calif.

[21] Appl. No.: 285,366

[22] Filed: Aug. 3, 1994

[51] Int. Cl.$^6$ .................. H03K 19/00; H03K 19/082; H03K 19/0948

[52] U.S. Cl. .................. 326/94; 326/97; 327/145; 327/207

[58] Field of Search .................. 326/94, 96–98, 326/18; 327/198, 202–203, 207, 210–211, 144–145, 162

[56] References Cited

U.S. PATENT DOCUMENTS

| | | | |
|---|---|---|---|
| 4,849,658 | 7/1989 | Iwamura et al. | 326/98 |
| 4,914,318 | 4/1990 | Allen | 327/211 |
| 5,121,002 | 6/1992 | Matsuzawa et al. | 326/96 |
| 5,173,626 | 12/1992 | Kudou et al. | 326/97 |
| 5,256,912 | 10/1993 | Rios | 327/144 |
| 5,263,173 | 11/1993 | Gleason | 326/97 |

OTHER PUBLICATIONS

"The Design and Analysis of VLSI Circuits", by Dobberpuhl, Chapter 6, pp. 360–364, Addison Welsey, 1985.

Primary Examiner—Edward P. Westin
Assistant Examiner—Jon Santamauro
Attorney, Agent, or Firm—James W. Rose

[57] ABSTRACT

A digital system including a synchronizer circuit which significantly reduces the occurrence of metastability conditions during data transfer between a first digital subsystem and a second digital subsystem is disclosed. The synchronizer circuit includes a master synchronizer cell and a slave synchronizer cell for handling data transfer from the first subsystem to the second subsystem. Each synchronizer cell includes a signal node, a discharge node, a first discharge patch and a second discharge path, both coupled between the signal node and the discharge node, and a control element coupled to the first discharge path and the second discharge path. The control element selectively activates the first discharge path and the second discharge path in response to an input signal.

17 Claims, 3 Drawing Sheets

5,510,732

SYNCHRONIZER CIRCUIT AND METHOD FOR REDUCING THE OCCURRENCE OF METASTABILITY CONDITIONS IN DIGITAL SYSTEMS

BACKGROUND OF THE INVENTION

1. Field of the Invention

The present invention relates to digital systems, and, more particularly to a circuit and method which substantially reduces the occurrence of metastability during dam transfer between a first digital subsystem operating at a first clock frequency and a second digital subsystem operating at a second clock frequency.

2. Description of the Prior Art

A synchronizer circuit is used in digital systems to manage data transfer between two subsystems, each operating at a different clock frequency. Referring to FIG. 1, a digital system is shown. The digital system 10 includes a first subsystem 12 operating at a first clock frequency $f_1$ (CLK $f_1$), a second subsystem 14 operating at a second frequency $f_2$, (CLK $f_2$) and a synchronizer circuit 16. The synchronizer circuit 16 includes a first master synchronizer cell 18a, a first slave synchronizer cell 18b, a clock divider 20, and an inverter 22 for handling data transfer between the first subsystem 12 to the second subsystem 14. The synchronizer 16 also includes a second master synchronizer cell 18c and a second slave synchronizer cell 18d, a clock multiplier circuit 24, and a second inverter 26.

The synchronizer circuit 16 is responsible for handling data transfer from the first digital subsystem 12 to the second digital subsystem 14, and vice versa. During data transfer from the first subsystem 12 to the second subsystem 14, the first subsystem 12 places data on its node Dout. The clock divider 20 receives CLK $f_1$ from the first subsystem 12 and divides it with a denominator so that the output frequency of the clock divider 20 substantially equals CLK $f_2$ of the second subsystem 14. The inverter 22 inverts the signal CLK $f_2$ creating signal CLK $\overline{f_2}$. Accordingly, the rising edge of CLK $f_2$ coincides with the falling edge of CLK $\overline{f_2}$ and visa versa. The master synchronizer cell 18a latches the data present at its node Din and provides that data to its output at nodes Q and $\overline{Q}$ during the period of CLK $f_2$. The slave synchronizer cell 18b latches and provides the data at nodes Q and $\overline{Q}$ to node Din of the second digital subsystem 14 when the signal CLK $\overline{f_2}$ transitions high. Since the data transfer operation is essentially the same in both directions, a similar description of the data transfer from the second digital subsystem 14 to the first digital subsystem 12 is not provided. Assuming the frequency of CLK $f_1$ is greater than of CLK $f_2$, it should be noted that the clock multiplier 24 is used in place of the clock divider 20 for data transfer from the second subsystem 14 to the first subsystem 12.

The synchronizer cells 18a, 18b, and 18d are essentially the same. Accordingly, only synchronizer cell 18a is described.

Referring to FIG. 2, a circuit diagram of the synchronizer cells 18a according to the prior art is shown. The circuit diagram of the cell 18a includes an N channel transistor 30, N channel transistor 32, N channel transistor 34, N channel transistor 36, inverter 38 and inverter 40. Inverter 38 includes N channel transistor 42 and P channel transistor 44. Inverter 40 includes N channel transistor 46 and P channel transistor 48. The gate of transistor 34 is coupled to Din, and the gate of transistor 30 is coupled to CLK $f_2$. The source and drain of transistor 30 and transistor 34 are coupled in series between node $\overline{Q}$ and ground. The gate of transistor 32 is coupled to CLK $f_2$, and the gate of transistor 36 is coupled to $\overline{\text{Din}}$. The source and drain of transistor 32 and transistor 36 are coupled between node Q and ground. The gates of transistor 42 and transistor 44 of inverter 38 are coupled to node $\overline{Q}$, and the output of the inverter 38 is coupled to node Q. The gates of transistor 46 and transistor 48 of inverter 40 are coupled to node Q, and the output node of the inverter 40 is coupled to node $\overline{Q}$.

During operation, the first subsystem 12 initiates a data transition on its node Dout when transferring data to the second subsystem 14. The data transition is applied to node Din of the first master synchronizer 18a. If the transition at Din of the synchronizer cell 18a coincides with a clock period of CLK $f_2$, transistor 34 and transistor 30 respectively turn on, pulling down node $\overline{Q}$. On the complementary side of the circuit, transistor 36 turns off as $\overline{\text{Din}}$ transitions low. As a result, node Q is driven high. The inverter 38 and the inverter 40 regeneratively drive one another, causing node Q to be pulled up and node $\overline{Q}$ to be pulled down. With the rising edge of CLK $\overline{f_2}$, which corresponds to the falling edge of CLK $f_2$, the logic potentials at node Q and node $\overline{Q}$ are latched by the slave synchronizer cell 18b and the data is provided to the second subsystem 14 in the same manner as described above.

One problem associated with the data transfer operation described above is that the digital system 16 is susceptible to metastability because data applied at node Din of the synchronizer cell 18a is asynchronous with respect to the clock signal CLK $f_2$. More specifically, metastability typically occurs when CLK $f_2$ is transitioning low, while Din is transitioning high. Under these circumstances, transistor 34 turns on, as transistor 30 begins to turn off. On the complementary side of the circuit, both transistor 32 and transistor 36 are turning off as CLK $\overline{f_2}$ and $\overline{\text{Din}}$ transition low respectively. Node $\overline{Q}$ may consequently be pulled to an intermediate voltage between Vcc and ground during the set up time of inverter 38, causing the regeneratively driven inverters 38 and 40 to possibly enter an "equilibrium" state. As a result, node Q and $\overline{Q}$ may become "trapped" at a metastability voltage, somewhere between Vcc and ground. This phenomena occurs because of the symmetrical design of the inverter 38 and inverter 40. Transistors 42 and 44 of inverter 38 and transistors 46 and 48 of inverter 40 all conduct equally when node Q and $\overline{Q}$ are at the metastability voltage. Nodes Q and $\overline{Q}$ may stay in the metastability condition indefinitely, until noise or some other factor causes the inverter 38 and inverter 40 to trip in one direction.

Dobberpuhl, in the article entitled "The Design and Analysis of VLSI Circuits", Addison Welsey, 1985, teaches a formula for calculating the average mean time before metastability failure (MTBF). The equation provides:

$$MTBF = \frac{e^{(T_f - T_p / T_{au})}}{T_o \cdot F_2 \cdot F_d} \qquad \text{[equation 1]}$$

Based on Dobberpurl's observations, the key to increasing MTBF is to maximize the value $T_{au}$. This may be accomplished by increasing the gain bandwidth of the transistors 42, 44, 46 and 48 of inverters 38 and 40 respectively. The gain bandwidth is proportional to gm/C where gm is the gain of the individual transistors 42, 44, 46 and 48 and C is the capacitance at nodes Q and $\overline{Q}$ of the cell 18.

The gain (gm) of the transistors 42, 44, 46 and 48 may be increased by enlarging the gate width or size these devices. The drawback with this approach, however, is that the larger the transistors, the greater the capacitance (C) at nodes Q and $\overline{Q}$. The advantages of the gain increase are therefore mitigated by the additional capacitance. Further, the larger transistors may also be unacceptable on modem VLSI chip designs because they may occupy too much space on the die.

Another problem with the prior art synchronizer cell 18 is that the pull down of nodes Q and $\overline{Q}$ occurs through the source and drain of the same switching devices used to control the potential at these nodes, namely transistors 30 and 34 and transistors 32 and 36 respectively. This arrangement is undesirable because the speed at which these nodes are pulled down is dependent on the switching characteristics of these transistors. Since these transistors 30 and 34 are typically relatively small MOSFET devices, their switching speed is relatively slow and their pull down capability is relatively week. Both these characteristics tend to increase the probability of metastability because it takes a longer period of time for the nodes Q and $\overline{Q}$ to switch from rail to rail, increasing the likelihood the nodes will get "stuck" between $V_{cc}$ and ground.

SUMMARY OF THE INVENTION

The present invention is a digital system including a synchronizer circuit which significantly reduces the occurrence of metastability conditions during data transfer between a first digital subsystem and a second digital subsystem. The synchronizer circuit includes a master synchronizer cell and a slave synchronizer cell for handling data transfer from the first subsystem to the second subsystem. Each synchronizer cell includes a signal node, a discharge node, a first discharge patch and a second discharge path, both coupled between the signal node and the discharge node, and a control element coupled to the first discharge path and the second discharge path. The control element selectively activates the first discharge path and the second discharge path in response to an input signal.

During operation, the first subsystem provides a data signal to an input port of the master synchronizer cell when transferring information to the second subsystem. The master synchronizer cell also receives a clock signal having a frequency substantially the same as that of the second subsystem. When the data signal substantially coincides with the period of the clock signal, the control element of the master synchronizer cell activates the first and second discharge paths, causing the signal node to discharge. As a result, the data signal at the signal node is provided to the slave synchronizer cell, where it is subsequently latched and provided to the second subsystem.

According to one embodiment of the invention, the control element includes a first MOS transistor coupled to receive the clock signal and a second MOS transistor coupled to receive the data signal. The source and drains of the two MOS transistors are coupled in series between the signal node and the discharge node, forming the first discharge path. The control element also include a bipolar transistor. The emitter and collector of the bipolar transistor are coupled between the signal node and the discharge node, forming the second discharge path. The base of the transistor is coupled to the first discharge path. According to another embodiment of the invention, the synchronizer cell may include a complementary signal node, discharge node, first discharge path and second discharge path.

The synchronizer cell of the present invention provides a significant improvement in reducing metastability between the fast and second subsystems. The second discharge path, including the bipolar transistor, provides faster, quicker harder and more efficient pull down of the signal node during a data transfer operation. Further, the inherent gain of the bipolar transistor greatly increases the gain (gm) at the signal node. The MTBF provided by equation 1 is therefor significantly, improved with the synchronizer cell of the present invention.

DESCRIPTION OF THE PREFERRED EMBODIMENT

The present invention is related to a novel design of the synchronizer cells 18a, 18b, 18c and 18d. The description below pertains specifically to the first master synchronizer cell 18a. Since the design of the other synchronizer cells 18b, 18c, 18d is essentially the same, the description below is applicable to the other cells of the synchronizer 16.

Figure 1:
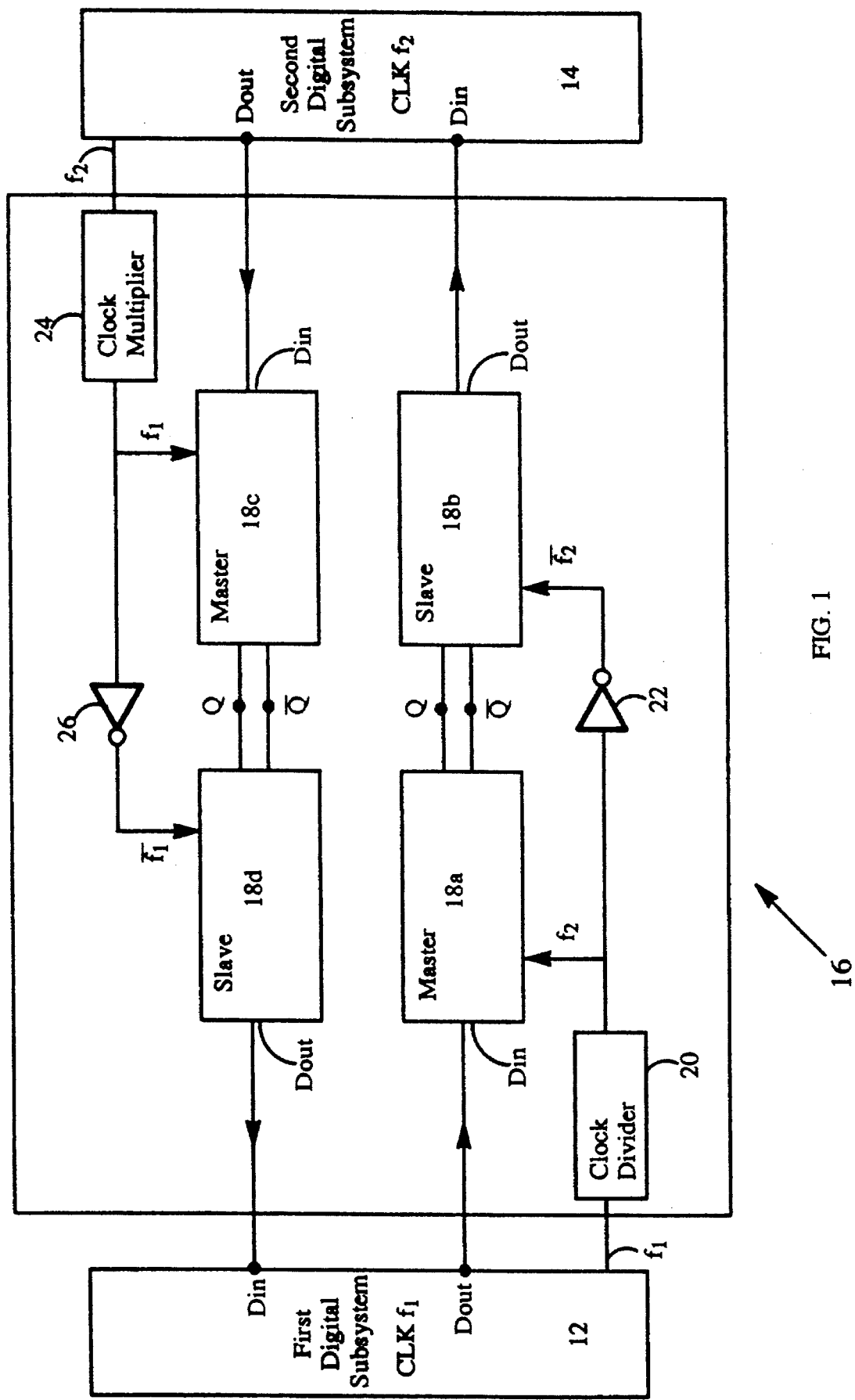
FIG. 1 is a block diagram of a digital system and a synchronizer circuit according to the present invention.
Figure 2:
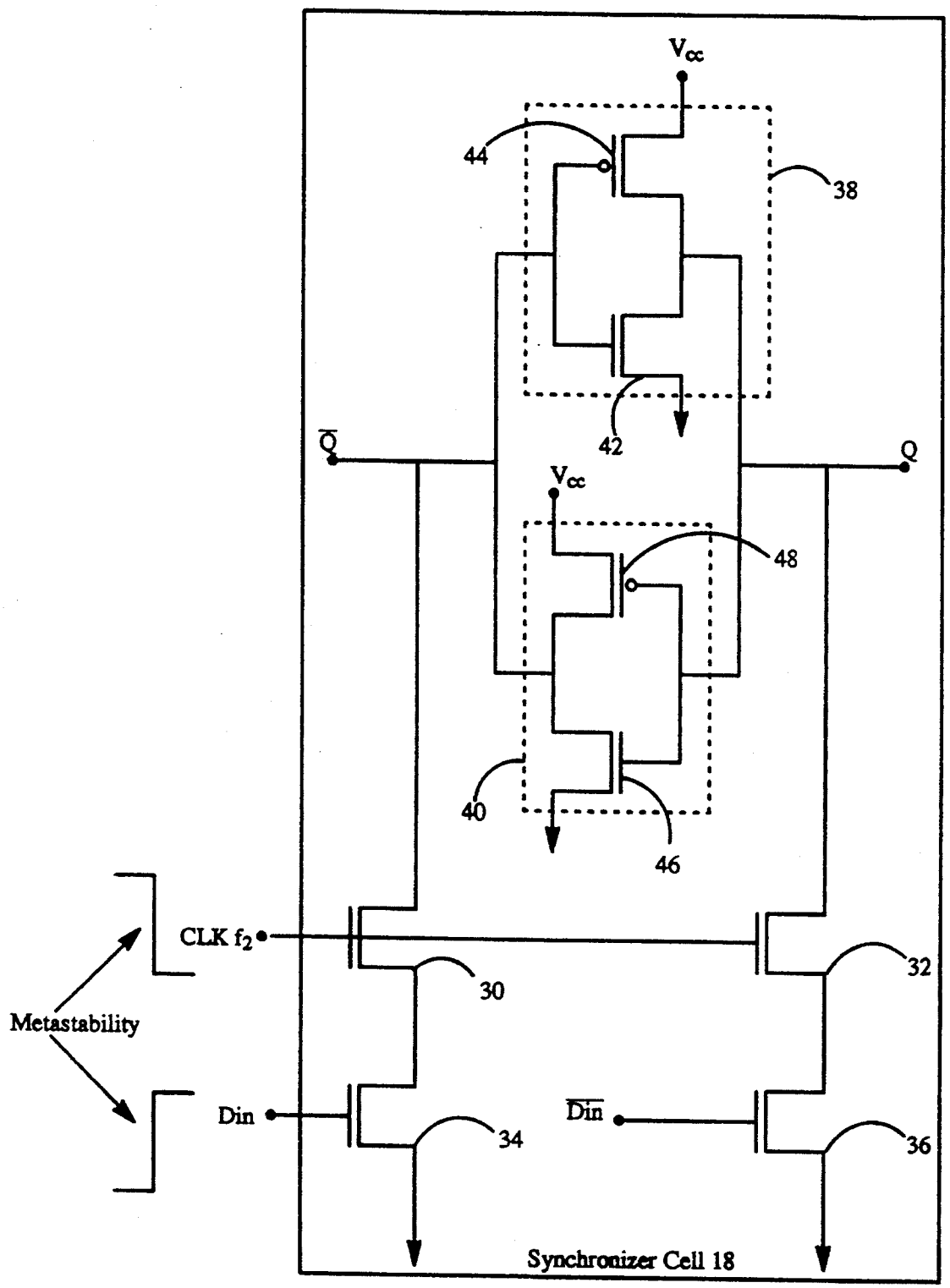
FIG. 2 is a circuit diagraming of a synchronizer cell of a prior art synchronizer circuit.
Figure 3:
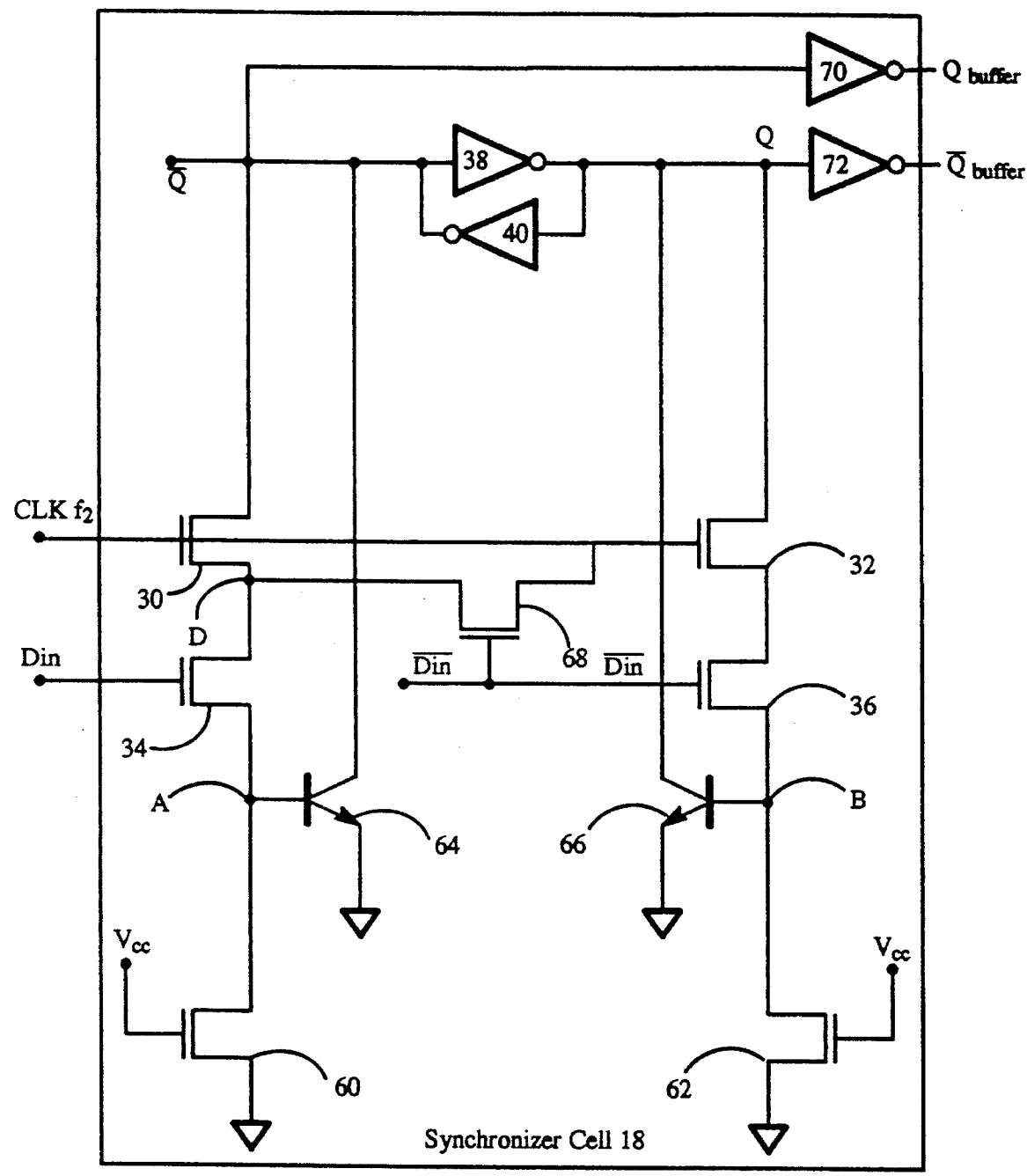
FIG. 3 is a circuit diagram of a synchronizer cell of the synchronizer circuit of the present invention.

Referring to FIG. 3, a circuit diagram of the synchronizer cell 18 according to the present invention is shown. The synchronizer cell 18 of the present invention includes transistor 30, transistor 32, transistor 34, transistor 36, inverter 38 and inverter 40. Since these components perform the same or similar functions as previously described, they are designated by the identical reference numbers in herein. In addition, the synchronizer cell 18 of the present invention includes N channel transistor 60, N channel transistor 62, bipolar transistor 64, bipolar transistor 66, N channel equalization transistor 68, inverter 70 and inverter 72.

The gate of transistor 60 is coupled to Vcc. The source and drain of transistor 60, transistor 34 and transistor 30 are coupled in series between node $\overline{Q}$ and ground. The gate of transistor 62 is coupled to Vcc. The source and drain of transistor 32, transistor 36, and transistor 62 are coupled in series between node Q and ground. The base of bipolar transistor 64 is coupled to node A, the collector is coupled to node $\overline{Q}$, and the emitter is connected to ground. The base of bipolar transistor 66 is coupled to node B, the collector is coupled to node Q, and the emitter is coupled to ground. In one embodiment, transistors 60 and 62 are long channel weak pull down devices that are always on to ensure that the base of bipolar transistors 64 and 66 do not saturate. The gate of transistor 68 is coupled to $\overline{Din}$, the source is coupled to CLK $f_2$, and the drain is coupled to node D. The input of buffer 70 is coupled to node $\overline{Q}$, and the output of the buffer 70 is coupled to node $Q_{buffer}$. The input of buffer 72 is coupled to node Q, and the output of buffer 72 is coupled to $\overline{Q}_{buffer}$.

Operation of the synchronizer cell 18 of the present invention is best described using an example. Consider a situation where Din is initially low and remains low during the period of CLK $f_2$. When CLK $f_2$ transitions high, transistor 30 turns on, but transistor 34 remains off because Din remains low, preventing the pull up of node A. Consequently, bipolar transistor 64 remains off, and node $\overline{Q}$ remains high. On the complementary side of the circuit, transistor 36 is on since $\overline{Din}$ is high and transistor 32 turns on when CLK $f_2$ transitions high, causing node B at the base of bipolar transistor 66 to be pulled up, turning on transistor 66. As a result, node Q is pulled down through the collector and emitter path of transistor 66. Transistor 32, transistor 36, and transistor 62 are also on providing a secondary discharge path to help the pull down of node Q. Transistor 62 also discharges the potential at the base of transistor 66, and when the base-emitter potential ($V_{be}$) falls below the turn on voltage, bipolar transistor 66, turns off. This self-terminating feature helps prevent transistor 66 from saturating.

On the otherhand, if Din transitions high during the period of CLK $f_2$, transistor 30 turns on, pulling up node D, and transistor 34 turns on, pulling up node A. When the potential at node A exceeds $V_{be}$, bipolar transistor 64 turns on pulling down node $\overline{Q}$. Transistor 30, transistor 34, and transistor 60 are, also on providing a secondary discharge path that helps pull down node $\overline{Q}$. Transistor 60 also discharges the base of transistor 64. When $V_{be}$ of transistor 64 falls below the turn on voltage, the transistor 64 turns off. On the complementary side of the circuit, when $\overline{Din}$ transitions low, transistor 36 turns off, terminating any pull up affect at node B. As a result bipolar transistor 66 is shut off, and node Q remains high.

The synchronizer cell 18 of the present invention may be modified to latch a transition of Din that occurs within a predetermined window of time after CLK $f_2$ begins to fall. This feature is useful because a data signal at Din, intended to occur during a period of CLK $f_2$, may occur after the intended period of CLK $f_2$ due to the fact the data and clock signals are asynchronous. This modification is realized by the equalization transistor 68.

If Din remains low during and after after a clock period of CLK $f_2$, then transistor 68 remains on because $\overline{Din}$ is high. The potential of node D, which is pulled up by transistor 30 when CLK $f_2$ is high, is approximately one gate threshold below Vcc (i.e., 5.0−1.0=4.0 volts) during the period of CLK $f_2$. When transistor 30 turns off, the potential at node D dissipates through transistor 68. Operation of the synchronizer cell 18 is thus identical to that described above when Din does not transition during or after the period of CLK $f_2$.

On the other hand, if Din starts to transition upward after the clock CLK $f_2$ begins to fall, transistor 34 begins to turn on causing node A to be pulled up toward the potential at node D. Simultaneously, transistor 68 begins to turn off, negating the pull up affect on node D. If, at any time, the potential at node A exceeds voltage $V_{be}$ of bipolar transistor 64, then transistor 64 is turned on and node $\overline{Q}$ is pulled down. If the potential at node A never exceeds $V_{be}$ because node D has sufficiently discharged, then bipolar transistor 64 never turns on. According to various embodiments, the window in which node $\overline{Q}$ is pulled down after to a late arriving signal at node Din relative to CLK $f_2$ may be selectively controlled by altering the dissipation characteristics of transistor 68 using well known semiconductor processing techniques. For example, dissipation characteristics of transistor 68 may be "tweeked" so that a transition of Din within a 0.5 ns window after the fall of clock signal CLK $f_2$ causes nodes Q and $\overline{Q}$ to switch.

The synchronizer cell 18 of the present invention offers a significant enhancement over the prior art. In the present invention, two discharge paths are provided for each node $\overline{Q}$ and Q. The emitter-collector paths of transistors 64 and 66 provide a primary discharge path and the source-drain paths of MOS transistors 30, 34 and 60 and MOS transistors 32, 36, and 62 provide a secondary discharge path for nodes $\overline{Q}$ and Q respectively. Whereas in the prior art, only one discharge path is provided through the relatively weak pull down MOS devices.

The present invention also provides earlier switching, relative to a given input signal, than otherwise possible with the prior art circuit. This advantage is realized by the arrangement of providing the base of transistors 64 and 66 coupled to node A and node B respectively. When Din begins to transition high, transistor 34 eventually turns on and initially conducts only a relatively small amount of current. With the present invention, the initial and relatively small amount of current generated when transistor 34 begins to turn on is sufficient to turn on bipolar transistor 64 hard, which in turn pulls down node $\overline{Q}$ much earlier than otherwise possible using MOS transistors alone. In the prior art synchronizer cell, transistor 34 must be almost completely on before any substantial pull down effects on node $\overline{Q}$ are realized through the discharge path defined by transistor 30 and transistor 34.

With the present invention, once a pull down decision is made by turning on either bipolar transistor 64 or 66, much faster and more efficient pull down of nodes Q and $\overline{Q}$ is provided. Bipolar transistors 64 and 66 are relatively hard driving devices and have the ability to pull down nodes Q and $\overline{Q}$ must faster and with more authority than the MOS devices. Accordingly, nodes Q and $\overline{Q}$ switch from rail to rail much faster, decreasing the probability of metastability.

The MTBF calculation of the synchronizer cell 18 of the present invention is significantly improved. According to one embodiment of the invention, the transistors 64 and 66 amplify their base current 150 to 200 times. This current gain is used to substantially drive the inverter 38 and the inverter 40. This gain is substantially larger than the gain provided exclusively by the individual transistors of invertor 38 and inverter 40 in the prior art circuit. Since the gain of these transistors is no longer critical, their size may be made much smaller, reducing capacitance at nodes Q and $\overline{Q}$. With present invention, the value of (gm) is made significantly larger while the capacitance C can be made significantly smaller, and as a result, the ratio of gm/C is significantly improved. It has been estimated that the MTBF of the present invention may be improved in the range of a million fold over the prior art.

In another embodiment, inverter 70 and inverter 72 may be used to buffer signals $\overline{Q}$ and Q before driving slave synchronizer cell 18b. The inverters 70 and 72 reduce the load as seen at nodes $\overline{Q}$ and Q and provide additional gain for signals $\overline{Q}_{buffer}$ and $Q_{buffer}$ respectively. Further, the transistor of buffers 70 and 72 may be fabricated with metal options to allow adjustment of the trip points of the two inverters and to allow for process variations and operation at a lower Vcc.

Although the present invention has been described using specific embodiments, other embodiments, alternatives and modifications will be apparent to those skilled in the art without deviating from the scope and spirit of the invention. For example, any high gain element, including MOS circuits, bipolar circuits, or a combination thereof, may be used along the primary discharge path. Further, the synchronizer circuit of the present invention may be used in any computer, communication, network or other switching digital system. It is intended that the above specification be only exemplary, and that the true scope and spirit of the invention be indicated by the following claims.

What is claimed is:

1. A synchronizer circuit for use in a digital system for managing data transfer between a first digital subsystem and second digital subsystem operating at different clock frequencies, the synchronizer circuit comprising:

a first element, the first element including:
   an input node coupled to receive an input signal operating at a first frequency;

a signal node configured to generate an output signal at a second frequency;

a discharge node;

a first discharge path coupled between the signal node and the discharge node;

a second discharge path coupled between the signal node and the discharge node;

a control element coupled to the first discharge path and the second discharge path to selectively discharge the signal node through the first discharge path and the second discharge path to the discharge node in response to the input signal received at the input node, the discharge of the signal node through the first discharge path and the second discharge path helping to reduce the chances of metastability occurring in the synchronizer circuit, a complementary input node coupled to receive a complementary input signal operating at the first frequency;

a complementary signal node configured to generate a complementary output signal at the second frequency;

a complementary discharge node;

a complementary first discharge path coupled between the complementary signal node and the complementary discharge node;

a complementary second discharge path coupled to between the complementary signal node and the complementary discharge node; and a complementary control element coupled to the complementary first discharge path and the complementary second discharge path to selectively discharge the complementary signal node through the complementary first discharge path and the complementary second discharge path in response to the complementary input signal received at the complementary input node, the discharge of the complementary signal node through the first complementary discharge path and the second complementary discharge path helping to reduce the chances of metastability occurring in the synchronizer circuit.

2. The synchronizer circuit of claim 1 wherein the second discharge path is primarily responsible for discharging the signal node relative to the first discharge path.

3. The synchronizer circuit of claim 1, wherein the second discharge path includes a termination element to deactivate the second discharge path after the signal node is substantially discharged.

4. The synchronizer circuit of claim 1, wherein the second discharge path comprises a bipolar transistor with its emitter and collector coupled between the signal node and the discharge node.

5. The synchronizer of claim 4, wherein the bipolar transistor has its base coupled to the first discharge path.

6. The synchronizer circuit of claim 1, wherein the first discharge path comprises an MOS transistor with its source and drain coupled between the signal node and the discharge node.

7. The synchronizer circuit of claim 1, wherein the control element is a transistor.

8. The synchronizer circuit of claim 7, wherein the transistor of the control element is coupled to receive the input signal.

9. The synchronizer circuit of claim 7, wherein the transistor of the control element is coupled to receive a clock signal operating at the second frequency.

10. The synchronizer circuit of claim 9, wherein the control element is further configured to selectively activate the first discharge path and the second discharge path in the event the input signal occurs after a predetermined time after the clock signal.

11. The synchronizer circuit of claim 1, wherein the first element is a master synchronizer coupled to receive the input signal from a first digital system operating at the first frequency, wherein the input signal is a data signal to be transferred to a second digital subsystem operating at the second frequency.

12. The synchronizer circuit of claim 11, further comprising a slave synchronizer coupled to the signal node of the master synchronizer for latching the signal on the signal node and providing the signal to the second digital subsystem.

13. The synchronizer circuit of claim 12, wherein the master synchronizer further receives a clock signal of substantially the same frequency of the second digital subsystem.

14. A method of operating a synchronizer circuit coupled between a first digital subsystem operating at a first frequency and a second digital subsystem operating at a second frequency, comprising the steps of either:

receiving a data signal from the first digital subsystem at an input port of a first synchronizer;

receiving a clock signal substantially equal to the second clock frequency of the second digital subsystem at a clock port of the first synchronizer; and activating a first discharge path and a second discharge path coupled to an output node of the first synchronizer in the event the step of receiving the data signal substantially coincides with the step of receiving the clock signal; or receiving a complementary data signal from the first digital subsystem at a complementary input port of the first synchronizer;

receiving the clock signal substantially equal to the second clock frequency of the second digital subsystem at a second clock port of the first synchronizer; and activating a first complementary discharge path and a second complementary discharge path coupled to a complementary output node of the first synchronizer in the event the step of receiving the complementary signal substantially coincides with the step of receiving the clock signal.

15. The method of claim 14, wherein the activation step further comprises a control step wherein the first discharge path controls the activation of the second discharge path.

16. The method of claim 15, wherein the control step further comprises the step of deactivating the second discharge path after the output node is substantially discharged.

17. A method of providing a synchronizer circuit for use in a digital system for managing data transfer between a first digital subsystem and second digital subsystem operating at different clock frequencies, the synchronizer circuit, comprising the steps of:

providing an input node coupled to receive an input signal operating at a first frequency;

providing a signal node configured to generate an output signal at a second frequency;

providing a discharge node;

providing a first discharge path coupled between the signal node and the discharge node;

providing a second discharge path coupled between the signal node and the discharge node; and a control element coupled to the first discharge path and the second discharge path to selectively discharge the signal node through the first discharge path and the second discharge path to the discharge node in response to the input signal received at the input node, the discharge of the signal node through the first discharge path and the second discharge path helping to reduce the chances of a metastability condition occurring in the synchronizer circuit;

providing a complementary input node coupled to receive a complementary input signal operating at the first frequency;

providing a complementary signal node configured to generate a complementary output signal at the second frequency;

providing a complementary discharge node;

providing a complementary first discharge path coupled between the complementary signal node and the complementary discharge node;

providing a complementary second discharge path coupled to between the complementary signal node and the complementary discharge node; and providing a complementary control element coupled to the complementary first discharge path and the complementary second discharge path to selectively discharge the complementary signal node through the complementary first discharge path and the complementary second discharge path in response to the complementary input signal received at the complementary input node, the discharge of the complementary signal node through the first complementary discharge path and the second complementary discharge path helping to reduce the chances of metastability occurring in the synchronizer circuit.

* * * * *